Nov. 11, 1952 D. C. MADSEN 2,617,901
HYDRAULIC FLUID FLOW CONTROL DEVICE WITH ELECTRIC SWITCH
Filed April 28, 1950 3 Sheets-Sheet 2
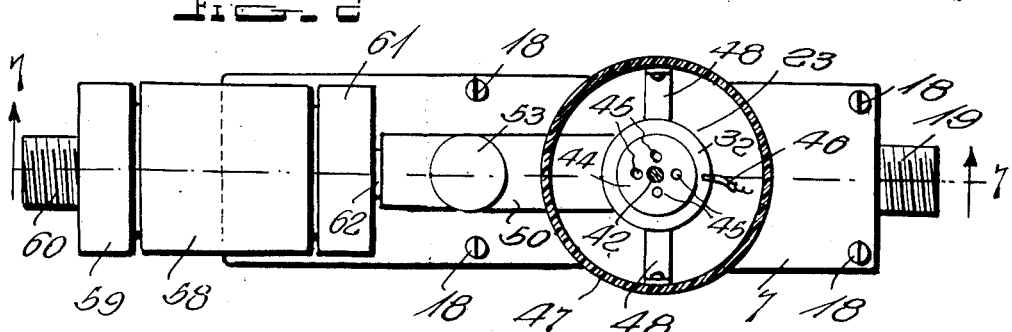
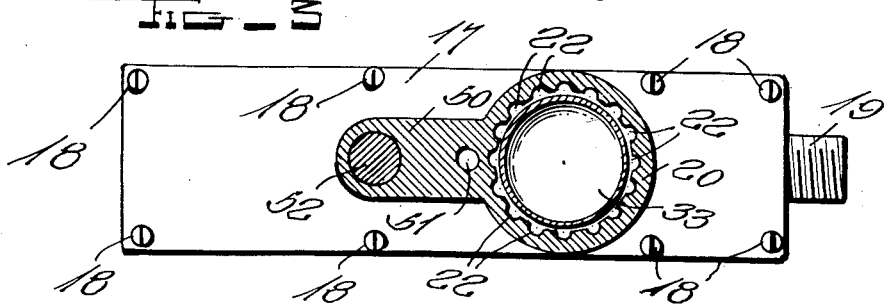
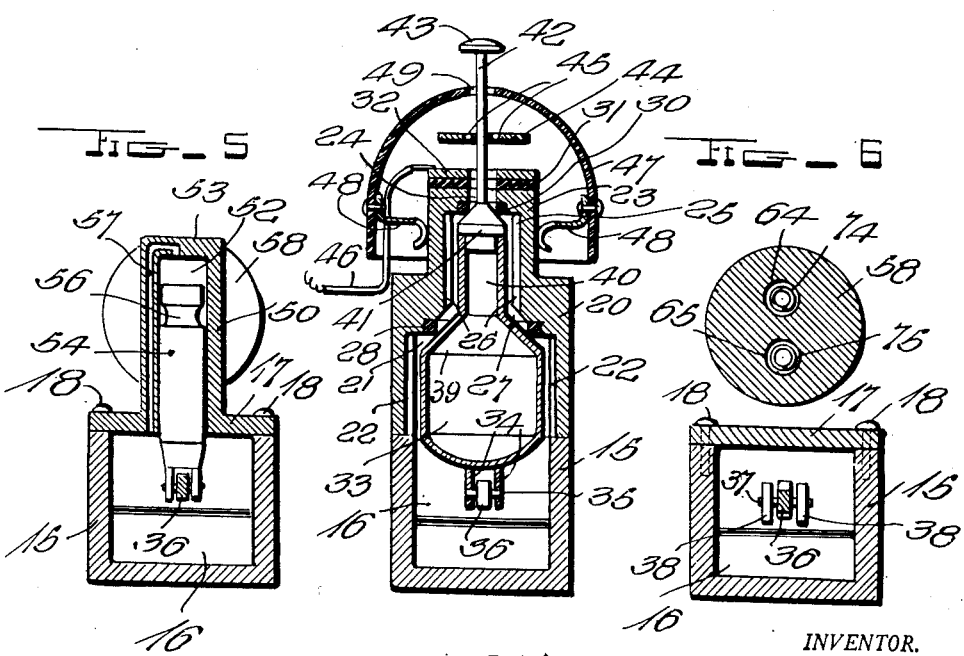
INVENTOR.
DAVID C. MADSEN
BY Jacob & Jacob
ATTORNEYS Nov. 11, 1952          D. C. MADSEN          2,617,901
HYDRAULIC FLUID FLOW CONTROL DEVICE WITH ELECTRIC SWITCH
Filed April 28, 1950          3 Sheets-Sheet 3
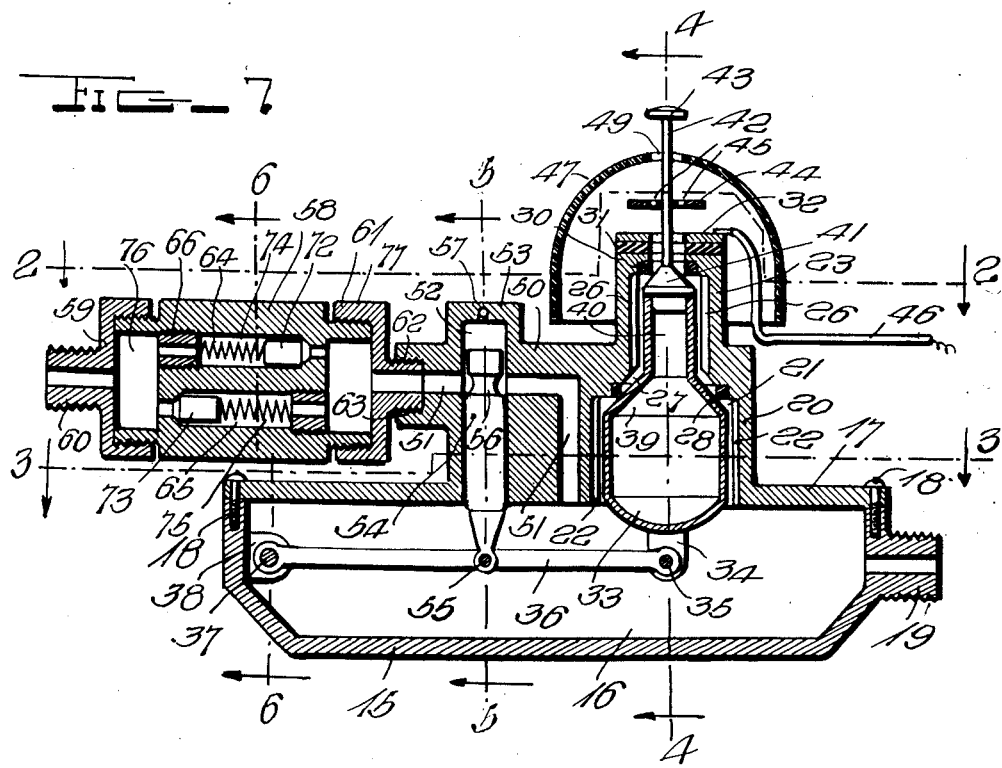
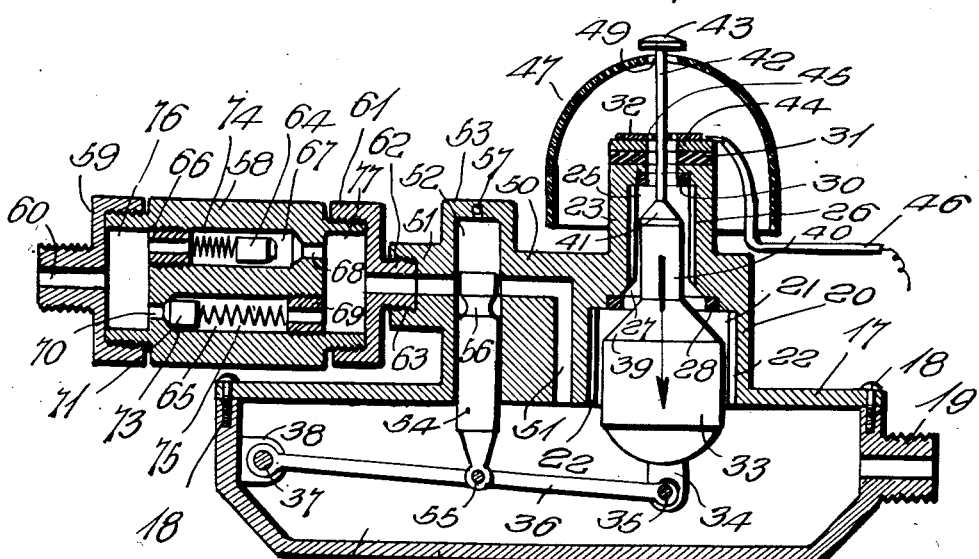
INVENTOR.
DAVID C. MADSEN
BY Jacobi & Jacobi
ATTORNEYS Patented Nov. 11, 1952

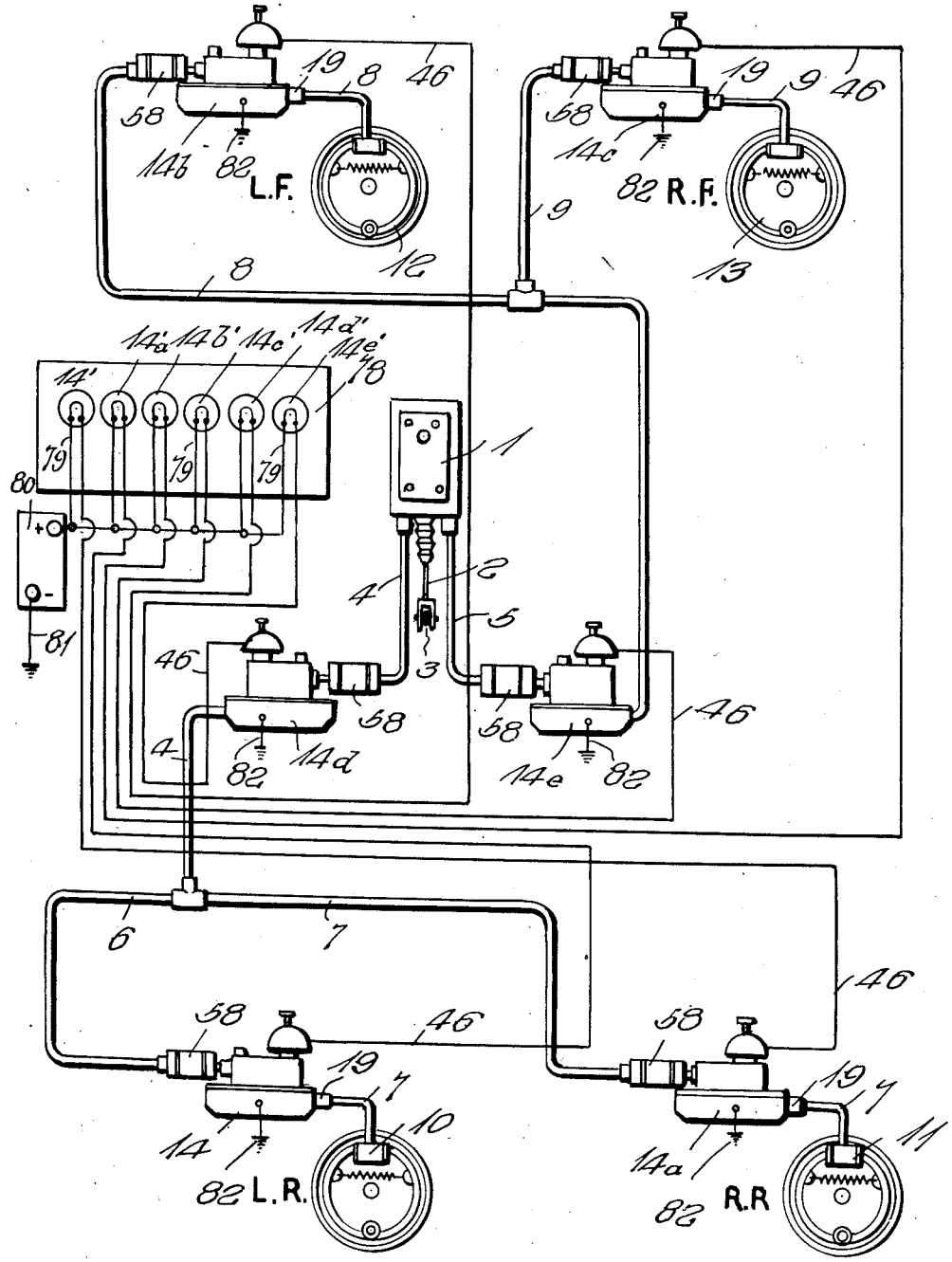

2,617,901

UNITED STATES PATENT OFFICE 2,617,901

HYDRAULIC FLUID FLOW CONTROL DEVICE WITH ELECTRIC SWITCH

David C. Madsen, Mission, Tex.

Application April 28, 1950, Serial No. 158,757

7 Claims. (Cl. 200—53)

This invention relates to a hydraulic brake system for motor vehicles and it is one object of the invention to provide a brake system wherein brakes at opposite sides of the front and also the back of the vehicle are connected in pairs, each pair of brakes being supplied with fluid under pressure from a master cylinder and pipes leading from the master cylinder having interposed therein devices for preventing leakage of fluid from the entire system if a pipe leading to one brake should be broken. By using this improved construction only a front brake or a rear brake, or a pair of front or rear brakes will be rendered inoperative in case a pipe is broken and the other brakes will remain operative and may stop the vehicle instead of it being necessary for the operator of the vehicle to depend upon hand operated brakes. As a result, collisions or other accidents due to the brakes not being applied quickly enough will be avoided.

Another object of the invention is to provide signals which are associated with the brakes and electrically operated in case a pipe should be broken, thus giving a warning to the operator of the vehicle and letting him know which brake or brakes have been rendered inoperative in sufficient time to stop the vehicle and also allowing him to compensate for side drift of swing in case only one brake has been rendered inoperative.

Another object of the invention is to provide a hydraulic brake system of such construction that it may be used upon vehicles having the wheels equipped with brake shoes and cylinders of a conventional form.

The invention is illustrated in the accompanying drawings wherein:

Fig. 1 is a diagrammatic view of the improved hydrauic brake system.

Fig. 2 is a view of an automatic cut out device taken along the line 2—2 of Figure 7 and showing the device partially in top plane and partially in section.

Fig. 3 is a longitudinal horizontal sectional view taken along the line 3—3 of Figure 7.

Fig. 4 is a vertical transverse sectional view taken along the line 4—4 of Figure 7.

Fig. 5 is a transverse sectional view taken along the line 5—5 of Figure 7.

Fig. 6 is a transverse sectional view taken along the line 6—6 of Figure 7.

Fig. 7 is a vertical sectional view taken longitudinally through the automatic cut out along the line 7—7 of Figure 2.

Fig. 8 is a view similar to Figure 7 showing valves moved out of their normal positions and in the positions assumed when a leak occurs.

In Figure 1 there has been shown a layout or diagram of the improved hydraulic brake system. In this Figure 1 is a master cylinder having a piston 2 connected with a pedal 3 which is mounted in the usual position in the motor vehicle and is operated by the driver when brakes are to be applied. Pipe lines 4 and 5 extend from the master cylinder and have branches 6 and 7 and 8 and 9 respectively extending to and connected with the cylinders of the left and right rear brakes 10 and 11 and the left and right front brakes 12 and 13. If uncontrolled communication exists between the master cylinder and the brake cylinders and a pipe section or tube of one of the pipe lines is broken liquid, or an equivalent fluid, filling the brake system will all drain out and all of the brakes will be rendered inoperative. This may not be noticed by the operator of the vehicle and under such conditions the vehicle will not be stopped when the operator steps on the treadle 3 to apply the brakes and stop forward movement of the vehicle. A collision, or other accident, will then be liable to occur as the hand brake must be used to stop the vehicle and often there is not sufficient time. In order to overcome this danger I have installed in the pipe lines and their branches control devices 14, 14a, 14b, 14c, 14d and 14e which are of duplicate construction and each is formed as shown in Figures 2 through 8. Referring to these figures it will be seen that each controlling device has a body 15 which is elongated and is hollow in order to form a chamber 16. A cover or lid 17 which is detachably secured by screws 18 closed the open top of the body and from one end of the body extends a nipple 19 the pipe section or tube through which fluid is forced when brakes are applied. A dome or tower 20 extends upwardly from the cover 17 and is formed internally with a pocket 21 having vertically extending grooves 22 formed in its annular wall and spaced from each other circumferentially thereof. A neck 23 extends upwardly from the top of the tower and is formed at its top with a center opening 24 which communicates with the bore 25 of the neck. Grooves 26 are formed in the annular wall of the bore in spaced relation to each other circumferentially thereof and at their lower ends communicate with a downwardly flared mouth 27 which communicates with the upper end of the pocket and about its lower edge is formed with a circumferentially extending groove in which fits a rubber ring or gasket 28. A rubber ring or gasket 30 serving as a valve seat fits into a groove about the lower portion of the opening 24 and upon the upper face of the upper end or head of the neck is mounted a rubber disc or gasket 31 which insulates a metal disc 32 from the neck.

In order to control flow of air through the pocket 21 and the bore 25 of the neck 23 there has been provided a hollow float valve 33 which operates in the pocket 21 and at its lower end is provided with depending ears 34 through which pass a pin 35 by means of which the ears are pivotally connected with an end of a lever 36. This lever extends longitudinally in the chamber 16 and is pivotally mounted for vertical movement by a pin 37 which connects it with ears 38 projecting from the wall at the opposite end of the body 15 from the nipple 19. The float valve 33 fits loosely in the pocket so that it may slide freely therein and its upper portion is formed with a frustro-conical portion 39 forming a valve portion and having tight sealing engagement with the gasket 28 when the float is the raised position shown in Figure 7. A neck 40 extends upwardly from the upper end of the valve portion 39 and its upper end carries a substantially conical valve member 41 which fits into and closes the upper end of the neck, as shown in Figures 4 and 7, and has close fitting sealing engagement with the rubber gasket 30 when the float is in the raised position. A stem 42 extends upwardly from the center of the valve member 41 and projects upwardly through the registering openings of the gasket 31 and the metal disc 32 and has a button 43 at its upper end so that it may be readily grasped and shifted longitudinally to adjust the position of the float and the valve members when necessary. This stem carries a metal plate or collar 44 formed with openings 45 is firmly mounted about the stem and is spaced upwardly from the metal disc 32 when the float is in its raised position and at rest upon the disc when the float moves downwardly from the position shown in Figure 7 to that of Figure 8. It will thus be seen that when the plate 44 is at rest upon the disc 32 the wire 46 which is secured to the disc will be grounded through the stem 42, the metal float 33, the lever 36, and the body 15. When, however, the float is in its raised position there will be space between the disc 32 and the plate 44 and the circuit will be broken. A shell or shield 47 which is formed of plastic, or other suitable insulating material, is disposed about the neck 23 of the dome and is removably supported by resilient securing arms 48 carried by the shell and frictionally gripping the neck, as shown in Figure 4, it being understood that while two of these arms have been shown any number desired may be provided. The stem 42 passes through an opening 49 formed at the center of the shell.

Fluid which flows through the pipes or tubes to the brake cylinders flows through the chamber 16 and in order that the fluid may enter the chamber an arm 50 which projects from the dome 20 is formed with a fluid passage or opening 51 which communicates with the chamber 16 a short distance from the dome and is intersected by a pocket or cylinder 52 formed vertically in the arm, the cylinder 52 having its lower end open and communicating with the chamber 16 and having its upper portion extending into a boss 53 projecting upwardly from the arm. A plunger 54 constituting a slide valve is slidable vertically in the cylinder and has close fitting engagement with the annular wall thereof so that fluid may not leak through the cylinder about the slide valve. This valve has its lower end pivotally connected with the lever 36 by a pin 55 and near its upper end the valve is formed with a circumferentially extending groove 56 which registers with the spaced and opposed portions of the fluid passage or opening 51 when the float is in its raised position and the lever holds the slide valve in its raised or opened position. When the slide valve is in the lowered or closed position shown in Figure 8 flow of fluid through passage 51 is shut off and fluid will be retained in the pipes of the brake system except fluid in the chamber 16 and the pipe leading from the nipple 19 to a brake cylinder. A port 57 of small diameter is formed in the wall of the cylinder 51, longitudinally thereof and has its lower end communicating with the chamber 16 and its upper end communicating with the upper end of the cylinder, as shown in Figure 4. Therefore fluid may flow between the chamber and the upper end of the cylinder and formation of a vacuum or an air cushion which would interfere with rapid movement of the slide valve will be prevented.

The pipes 4, 5, 6, 7, 8, and 9 are not directly connected with the outer ends of the fluid passages 51 but are connected with valve casings 58. Each of these valve casings has a head 59 at its outer end formed with a bored neck 60 with which the companion pipe is connected and at its inner end is provided with another head 61 formed with a bored neck 62 which is screwed into a socket 63 at the outer end of the fluid passage 51. Valve chambers 64 and 65 are formed through the solid body portion of the valve casing, and referring to Figures 7 and 8 it will be seen that the upper chamber 64 has its outer end filled by a bored plug 66 and is formed with a valve seat 67 about the opening 68 at its inner end while the lower valve chamber 65 has its inner end filled by a bored plug 69 and at its outer end is formed with an opening 70 surrounded by a valve seat 71. Check valves 72 and 73 are slidable longitudinally in the valve chambers and are yieldably held closed by springs 74 and 75. These valves face in opposite directions and the valve 73 is forced to an opened position by pressure applied to fluid within the outer chamber 76 when the brake pedal 3 is stepped upon to apply the brakes, the valve 72 being forced open and allowing free flow of fluid from chamber 77 into chamber 76 when pressure is removed from the brake pedal and a partial vacuum in the master cylinder draws fluid back from chamber 76 and the main pipes 4 and 5 into said master cylinder.

When the improved brake system is installed, the control devices 14 through 14e are installed in the pipe lines and their wires 46 connected with companion signal lamps 14', 14a', 14b', 14c', 14d' and 14e' which are mounted upon a board or panel 78 in view of the driver of the motor vehicle. These signal lamps are connected by wires 79 with one side of the battery 80 which is grounded by its ground wire 81 and as the bodies 15 of the control devices are grounded, as shown at 82, the signal lamps will be individually lighted when the bridging plates or discs 44 of their companion control devices are in the lowered position and rest upon the discs 32 to which the wires 46 are secured. Under normal conditions, the circuit closing plates or discs are in the raised or opened position, and so held by the floats 33 which are raised by fluid in the casings 15 and maintain their valve portions 39 and the valve members 41 in closing engagement with the valve seats 28 and 30. The valve 54 of each control device is in its opened position and when the operator of the motor vehicle steps upon the brake pedal, pressure is exerted to force fluid through the pipe lines and the brake cylinders to apply all the brakes, the check valve 73 being opened by the applied pressure.

If one of the brake cylinders develops a leak or the pipe line leading to it from its control device leaks or is broken by a stone thrown from a road along which the vehicle is travelling, fluid escapes from the chamber 16 of the companion control device and the float moves downwardly from the position shown in Figure 7 to that of Figure 8. When the float moves downwardly, the valve 54 is moved downwardly with it to the closed position and air enters through the openings 45 or the plate 44 and the grooves 26 and 22 and fills the portion of the chamber 16 above the level of fluid therein. The valve 54 prevents fluid from escaping from the inner end chamber of the valve casing 58 and as the brake fluid will be retained in the rest of the brake system, the other brakes will remain operative. As soon as the circuit closing plate 44 comes to rest upon the plate or disc 32, a circuit will be closed through the companion signal lamp and this lamp will be lighter and serve as a warning to the driver that a certain brake is inoperative. The driver will then be very careful when applying his brakes and avoid side swinging of the front or rear end which would be liable to cause an accident.

If a break in a pipe ocurs between the master cylinder and one of the control devices 14d or 14e either the two rear brakes or the two front brakes will be rendered inoperative, but as the two remaining brakes are located at opposite sides of the vehicle, the brakes may be safely applied without danger of side swing. When a garage or service station is reached, the leaky brake cylinder is repaired or a broken pipe replaced with a new one and one mechanic pours in a fresh supply of brake fluid and operates the master cylinder while another grasps the button 43 of the valve stem and holds the valves 28 and 41 out of a fully closed position so air may escape from the casing through the grooves in the dome 20 and its neck 23 while the chamber is being filled with fluid. The valve 54 moves upwardly to the opened positioned during upward movement of the float and fluid which is forced past the check valve 73 into the chamber 77 may flow through the passage 51 and into the chamber 16. When the float is in its fully raised position, fluid is prevented from escaping through the dome and its neck and air is prevented from entering the chamber 16.

It will thus be seen that a vehicle equipped with the improved brake system is free from danger caused by inoperative brakes as the driver will be warned when one or more of the brakes is not operative and can take proper precautions and have necessary repairs made as soon as he reaches a service station.

In addition, the fact that a pipe connected with one brake or a pair of brakes has been broken will not render the entire brake system inoperative and a quick stop may be made by means of the remaining brakes, instead of the driver not knowing that the brakes are useless and having to apply a hand operated emergency brake after discovering that his hydraulic brakes are not in working order.

From the foregoing description of the construction of my improved hydraulic brake system, the method of making same and the application thereof to use will be readily understood and it will be seen that I have provided a comparatively simple, inexpensive and efficient means for carrying out the various objects of my invention.

While I have particularly described the elements best adapted to perform the functions set forth, it is apparent that various changes in form, proportion and in the minor details of construction may be resorted to, without departing from the spirit or sacrificing any of the principles of the invention.

Having thus described my invention, what is claimed is:

1. A device for controlling flow of fluid through a pipe line comprising a casing having a chamber therein, a cover for said chamber, a dome extending upwardly from said cover and having an upwardly extending hollow neck formed with an opening at its top, walls of the dome and its neck being formed with vertically extending grooves, a valve seat in the dome about its junction with said neck, a valve seat about the inner end of the opening formed through the top of the neck, said dome having an extension extending longitudinally of the cover and formed with a fluid passage having a vertically extending inner end portion communicating with the chamber and a horizontally extending outer portion intersected by a vertically extending valve cylinder open at its lower end, a lever in said chamber extending longitudinally therein and pivotally mounted at its outer end, a valve plunger pivoted to said lever and extending upwardly therefrom and slidable longitudinally in the valve cylinder and formed near its upper end with a circumferentially extending groove registering with the horizontal portion of the fluid passage when the plunger is shifted upwardly to an opened position, the upper portion of the valve plunger blocking the fluid passage when the plunger is moved downwardly to a closed position, a float carried by said lever movable vertically in said dome and having a valve portion and a neck extending upwardly therefrom in the neck of the dome and provided at its upper end with a valve member having a stem extending upwardly through the opening at the top of the neck of the dome, the valve portion of the float and the valve member having sealing engagement with the valve seats when the float is in a raised position, a contact mounted upon the neck of the dome in insulated relation thereto, and a contact carried by the valve stem in position for engaging the first contact and closing a signal-energizing circuit when the float moves downwardly and the valve is in its closed position.

2. A device for controlling flow of fluid through a pipe line comprising a casing having an outlet, a top for said casing formed with a dome and with an inlet passage intercepted by a vertically extending cylindrical valve chamber, said dome having a reduced upper portion formed with an air passage at its top and being provided with a valve seat about the air passage and with another valve seat spaced downwardly from the first valve seat, a valve plunger slidable vertically in the valve chamber from an upper open position to a lowered closed position, a lever in said casing to which the lower end of the valve plunger is pivotally connected, a float pivoted to said lever and extending upwardly therefrom into said dome, said float being provided with a valve portion for engaging the lower valve seat and with a valve member at its upper end for engaging the upper valve seat, the float when in a raised position maintaining the valve plunger in its opened position, a stem for the second valve of the float extending upwardly through the opening at the top of the dome, a contact about the opening through which the stem passes insulated from the dome and to which a circuit wire is adapted to be secured, and a contact carried by said stem and being spaced upwardly from the first contact when the float is in a raised position and in circuit-closing engagement with the first contact when the float is in a lowered position.

3. A device for controlling flow of fluid through a pipe line comprising a casing having an outlet, a top for said casing formed with a dome and with an inlet passage intercepted by a vertically extending cylindrical valve chamber, said dome having an air passage at its top and a valve seat surrounding the inner end of the air passage, a lever pivotally mounted in said casing, a float carried by said lever and extending upwardly into the dome and serving to lift the lever as it moves upwardly in the dome, a valve plunger slidable vertically in the valve chamber and pivoted to said lever and being movable upwardly by the lever from a lowered position in closing relation to the fluid inlet passage to an opened position, a valve member carried by said float and closing the air passage when the float is in a raised position, a stem for said valve member extending upwardly through the air passage, a contact insulated from the dome, and a contact carried by said stem and engaging the first contact to close a circuit when the float moves downwardly to effect closing of the fluid passage.

4. A device for controlling flow of fluid through a pipe line comprising a casing having a fluid outlet, a top for said casing formed with a float chamber having an air passage at its top, the top being also formed with a fluid inlet passage and with a valve chamber intersecting the fluid passage, a valve plunger slidable in the valve chamber from a lower closed position to a raised opened position, a lever in said casing carrying the valve plunger, a float carried by said lever and shiftable vertically in the float chamber, a valve carried by said float and closing the lower end of the air passage when the float is raised, a stem for said valve projecting upwardly through the air passage, a contact insulated from the top and surrounding the air passage, and a contact carried by the valve stem and movable with the float from a position in upwardly spaced relation to the insulated contact to a position in circuit-closing engagement therewith when the float is lowered and the valve plunger is in its closed position.

5. A device for controlling flow of fluid through a pipe line comprising a casing having a fluid outlet, a top for said casing formed with a float chamber having an air passage at its top, the top being also formed with a fluid inlet passage and a valve chamber intersecting the fluid passage, a valve plunger slidable vertically in the valve chamber from a lowered closed position to a raised opened position, a lever in said casing carrying the valve plunger, a float carried by said lever and shiftable vertically in the float chamber, a stationary contact surrounding the air passage and insulated from the float chamber, a movable contact supported by and moving with the float from an opened position above the stationary contact to a circuit-closing position in engagement with the stationary contact when the float moves downwardly and the valve plunger is in its closed position.

6. A device for controlling flow of fluid through a pipe line comprising a casing having a fluid outlet, a top for said casing formed with a float chamber having an air passage at its top, the top being also formed with a fluid inlet passage having a horizontally extending portion and with a vertical valve chamber intersecting the horizontal portion of the fluid passage, a valve plunger slidable vertically in the valve chamber through the lower end thereof from a lowered closed position to a raised opened position, a lever in said casing carrying the valve plunger, a float carried by said lever and shiftable vertically in the float chamber through the lower end thereof, an insulated contact surrounding the air passage, a stem extending upwardly from the float through the air passage, a movable contact supported by the stem and moving with the float from an opened position above the insulated contact to a circuit-closing position in engagement with the insulated contact when the float moves downwardly and the valve plunger is in its closed position.

7. A device for controlling flow of fluid through a pipe line comprising a casing having a fluid outlet, a top for said casing formed with a float chamber having an air passage surrounded by a valve seat at its top, the top being also formed with a fluid inlet passage and with a valve chamber intersecting the fluid passage, a valve plunger slidable vertically in the valve chamber from a lowered closed position to a raised opened position, a lever in said casing pivoted to the lower end of the valve plunger, a float pivoted to said lever and shiftable vertically in the float chamber, a valve carried by said float and engaging the valve seat to close the air passage when the float is raised, a stem for said valve extending upwardly through the air passage, an insulated contact surrounding the air passage, a movable contact carried by the valve stem and moving with the float from an opened position above the insulated contact to a circuit-closing position in engagement with the insulated contact when the float moves downwardly and the valve plunger is in its closed position.

DAVID C. MADSEN.

REFERENCES CITED

The following references are of record in the file of this patent:

UNITED STATES PATENTS

| Number | Name | Date |
|---|---|---|
| 2,058,595 | Klein | Oct. 27, 1936 |
| 2,093,015 | Madden | Sept. 14, 1937 |
| 2,121,653 | Davis | June 21, 1938 |
| 2,169,462 | De Grace | Aug. 15, 1939 |
| 2,195,214 | Jacob | Mar. 26, 1940 |

FOREIGN PATENTS

| Number | Country | Date |
|---|---|---|
| 634,169 | France | Nov. 8, 1927 |
| 635,209 | Germany | Mar. 26, 1940 |